United States Patent
Wang et al.

(10) Patent No.: US 9,970,420 B2
(45) Date of Patent: May 15, 2018

(54) DUAL HORSEHEAD BLOCK AND TACKLE PUMPING UNIT

(71) Applicants: Yi Wang, Panjin (CN); Jin Wang, Panjin (CN); Zijiang Yang, San Jose, CA (US)

(72) Inventors: Yi Wang, Panjin (CN); Jin Wang, Panjin (CN); Zijiang Yang, San Jose, CA (US)

( * ) Notice: Subject to any disclaimer, the term of this patent is extended or adjusted under 35 U.S.C. 154(b) by 370 days.

(21) Appl. No.: 14/876,819

(22) Filed: Oct. 7, 2015

(65) Prior Publication Data

US 2016/0123124 A1 May 5, 2016

(30) Foreign Application Priority Data

Nov. 3, 2014 (CN) .......................... 2014 1 0647479

(51) Int. Cl.
| | |
|---|---|
| *F04B 47/02* | (2006.01) |
| *F04B 17/03* | (2006.01) |
| *F16H 3/66* | (2006.01) |
| *E21B 43/12* | (2006.01) |

(52) U.S. Cl.
CPC ............ *F04B 17/03* (2013.01); *E21B 43/127* (2013.01); *F04B 47/022* (2013.01); *F16H 3/666* (2013.01); *E21B 2043/125* (2013.01)

(58) Field of Classification Search
None
See application file for complete search history.

(56) References Cited

U.S. PATENT DOCUMENTS

| | | | | |
|---|---|---|---|---|
| 3,621,723 | A * | 11/1971 | Miller | ................... F16H 37/122 74/29 |
| 7,001,157 | B2 * | 2/2006 | Xiaoxi | .................. E21B 43/126 166/68.5 |
| 8,950,473 | B2 * | 2/2015 | Smith | ..................... F04B 47/14 166/75.11 |
| 8,955,582 | B2 * | 2/2015 | Wang | ..................... F04B 47/02 166/105 |

\* cited by examiner

*Primary Examiner* — Robert W Hodge
*Assistant Examiner* — Ryan P Dodd
(74) *Attorney, Agent, or Firm* — Ash Tankha; Lipton, Weinberger & Husick (57) ABSTRACT

A dual horsehead block and tackle beam pumping unit including a steel frame, a walking beam installed on top of the steel frame, horseheads with movable pulleys, pulling wire ropes, load wire ropes, damping extension springs, a reversing reducer, an output drum, a counterweight box, reversing brake mechanisms, and an electric motor is provided for single well and dual well operations. The horseheads are installed on opposing ends of the walking beam. The movable pulley of each horsehead has a pulling wire rope. The first and second ends of each pulling wire rope are connected to the damping extension spring and the output drum respectively. A lower end of the load wire rope hanging on the right hand side horsehead is connected to the counterweight box. On the bottom of the steel frame, the electric motor, the reversing reducer, and the output drum are installed on a base.

14 Claims, 8 Drawing Sheets

DUAL HORSEHEAD BLOCK AND TACKLE PUMPING UNIT

CROSS-REFERENCE TO RELATED APPLICATIONS

This application claims priority to and the benefit of the non-provisional patent application number 201410647479.8 titled "Dual Horsehead Block and Tackle Pumping Unit", filed in the State Intellectual Property Office of the People's Republic of China on Nov. 3, 2014. The specification of the above referenced patent application is incorporated herein by reference in its entirety.

FIELD OF THE INVENTION

This invention discloses an oil production apparatus used in oil fields, and more specifically, a dual horsehead block and tackle beam pumping unit.

BACKGROUND

Conventional beam pumping units have long been the mainstream mechanical equipment for worldwide oil production. The conventional beam pumping units adopt a four-bar linkage mechanism and have advantages such as a reasonable velocity curve and decent reliability. However, there are several disadvantages including large peak torque, low mechanical efficiency, poor balancing, high manufacturing costs, and high energy consumption, which prevent further improvement of the oil production efficiency and cost efficiency. For example, in the patent titled "Beam Balance Block and Tackle Pumping Unit", published on Aug. 13, 2014 by the State Intellectual Property Office of the People's Republic of China with application number 201410239831.4, a pulling wire rope from an output drum passes through a guide wheel first, and is then folded back to pass through a movable pulley from the outside of a horsehead, that is, from the curved side of the horsehead, and is finally connected to a damping extension spring on the ground. This wiring method of the pulling wire rope has the following defects: 1. The pulling wire rope passes through an additional guide wheel which increases the number of times the pulling wire rope is bent, which in turn affects the service life of the pulling wire rope. 2. When the guide wheel is lined up with the movable pulley on the horsehead perpendicularly to the ground, and the pulling wire rope is tangent to both wheels, the pulling wire rope can no longer pull the horsehead downward. Therefore, a sucker rod does not have enough stroke length. Experiments have proved that this design is not practical.

SUMMARY OF THE INVENTION

The aim of this invention is to a provide a dual horsehead block and tackle beam pumping unit which can achieve a maximum stroke length as well as low cost, low energy consumption, good safety, high reliability, simplicity in structure, and ease of use.

The dual horsehead block and tackle beam pumping unit eliminates the guide wheel in the aforementioned prior art. The dual horsehead block and tackle beam pumping unit comprises a steel frame, a walking beam, horseheads with movable pulleys, pulling wire ropes, load wire ropes, an electric motor, a reversing reducer, an output drum, damping extension springs, a counterweight box, and reversing brake mechanisms. The structure of the dual horsehead block and tackle beam pumping unit is as follows: the walking beam is installed on top of the steel frame with a hinged connection. A horsehead is installed on each end of the walking beam. Each horsehead has a movable pulley which has a pulling wire rope threaded through. The ends of each pulling wire rope are connected to the output drum and the damping extension spring respectively. A sucker rod is connected to the horsehead on the left side by a load wire rope through a rope hanger. The lower end of the load wire rope hanging on the right-hand side horsehead is connected to the counterweight box. On the bottom of the steel frame, the electric motor, the reversing reducer, the output drum, and the reversing brake mechanisms are installed on a base. An input shaft and an output shaft of the reversing reducer are connected to the electric motor and the output drum respectively. The reversing brake mechanisms are installed on the reversing reducer.

The working process of the dual horsehead block and tackle beam pumping unit is as follows: initially, the electric motor drives the reversing reducer when the two semi-axles stretching out of a reversing reducer casing and brake discs installed on the semi-axles have no load, and the two brakes in the reversing brake mechanisms are idle. When a direct current (DC) power supply is turned on and one of the two proximity switches in a reversing control system is activated, the corresponding electromagnet is activated and thus attracts the brake disc and attaches itself to the brake disc. The brake disc drives a lever to rotate together to a certain angle where the upper end of the lever pushes in a plunger of a plunger hydraulic pump. The positive pressure amplified by the lever and the plunger hydraulic pump is applied to a brake caliper to stop the corresponding brake disc and semi-axle. The reversing reducer drives the output drum in a clockwise direction. At this moment, the pulling wire rope on the left side of the output drum drives the left horsehead to swing upward through the movable pulley installed on the horsehead. The left horsehead in turn drives the sucker rod upward through the load wire rope, while the right horsehead moves downward with the counterweight box connected by the load wire rope. When the suspension point reaches the other proximity switch, the DC power supply is shut off and the working brake disc is released. After a delay of several seconds, to eliminate any possible momentum and deformation of the sucker rod, power is applied to the other electromagnet to lock its corresponding brake disc and semi-axle so that the reversing reducer drives the output drum in a counterclockwise direction and hence the reversing process is accomplished. At this moment, the left horsehead drives the sucker rod downward through the load wire rope and the right horsehead moves upward with the counterweight box. The above process is repeated and normal oil production can be achieved by alternating the direction of the output drum. The delay time between alternating the two electromagnets can be adjusted based on different viscosities of crude oil and volume of the oil production.

The dual horsehead block and tackle beam pumping unit disclosed herein does not require the four-bar linkage reversing mechanism. The dual horsehead block and tackle beam pumping unit eliminates parts typically found in conventional beam pumping units such as a crank, a counterweight, Pitman arms, a horizontal beam, a rear axle, etc. The dual horsehead block and tackle beam pumping unit has also reduced the weight of the reversing reducer. The dual horsehead block and tackle beam pumping unit has the advantages of low cost, low power consumption, good safety and reliability, ease of maintenance and adjustment, etc. The dual horsehead block and tackle beam pumping unit substantially increases the cost efficiency in oil production. The dual horsehead block and tackle beam pumping unit can be used not only for a single well operation, but also for a dual well operation. The dual horsehead block and tackle beam pumping unit has more advantages when used for dense and viscous, heavy oil wells where the loads are large.

The advantages and the effects of the dual horsehead block and tackle beam pumping unit disclosed herein are further demonstrated as follows:

1. Low manufacture cost. Replacing the four-bar linkage reversing mechanism with the reversing reducer saves a significant amount of steel usage. The torque of the reversing reducer is reduced by applying the principles of pulley systems, and hence the weight of the reversing reducer is reduced by 40%. Also, the counterweight box can be filled with rocks, which reduces material costs and manufacture costs.

2. Low energy consumption. The dual horsehead structure resembles a balance scale, and has optimum balance in structure. The dual horsehead structure consumes 30% less energy than the conventional beam pumping units. The use of the movable pulley to raise the sucker rod frequently saves both torque and energy. The power of the electric motor can be reduced by ⅓.

3. High reliability and safety. Due to the fact that the pulling wire ropes are not loaded by the suspension point of the sucker rod and the pulling wire rope drives the horsehead through the movable pulley which reduces the force by ½, the load on the pulling wire rope is reduced and hence the service life is significantly increased. Even under rare circumstances when the pulling wire rope is broken, the dual horsehead block and tackle beam pumping unit still will not cause any accidents. In particular, when the sucker rod is broken, loses its load or falls off because the load wire rope is broken, the pulling wire rope can provide protection by preventing the counterweight box from free falling.

4. Ease of maintenance and adjustment. Because the pulling wire ropes are connected to the damping extension springs on the ground, it is convenient to adjust the tension on the pulling wire ropes.

5. Easy adjustment of the pumping stroke length. Adjustment of the stroke length can be achieved by moving the positions of the proximity switches.

DETAILED DESCRIPTION OF THE INVENTION

A further demonstration of the dual horsehead block and tackle beam pumping unit 100 combined with drawings and implementations of specific embodiments is disclosed herein.

Figure 1:
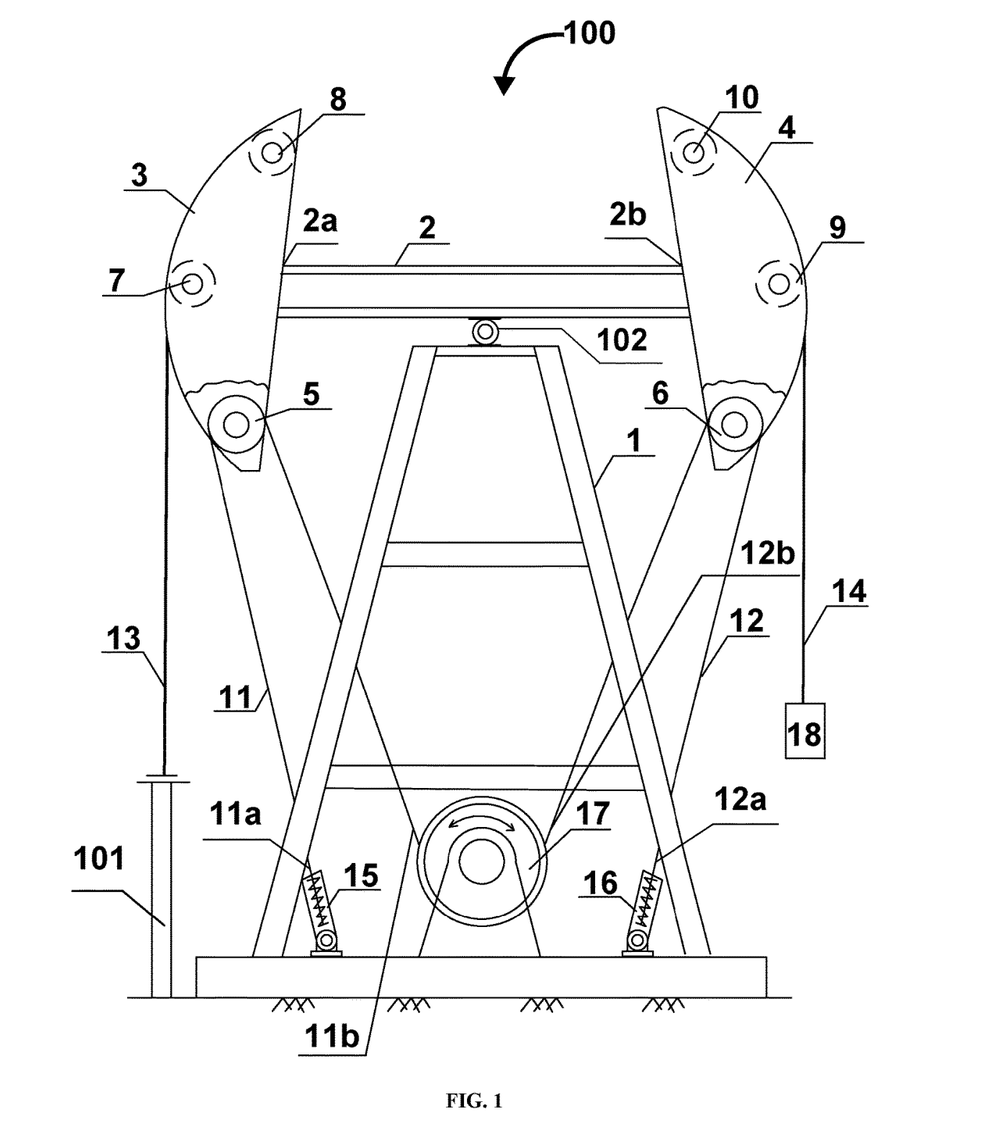
FIG. 1 illustrates the overall structure of a dual horsehead block and tackle beam pumping unit.
Figure 2:
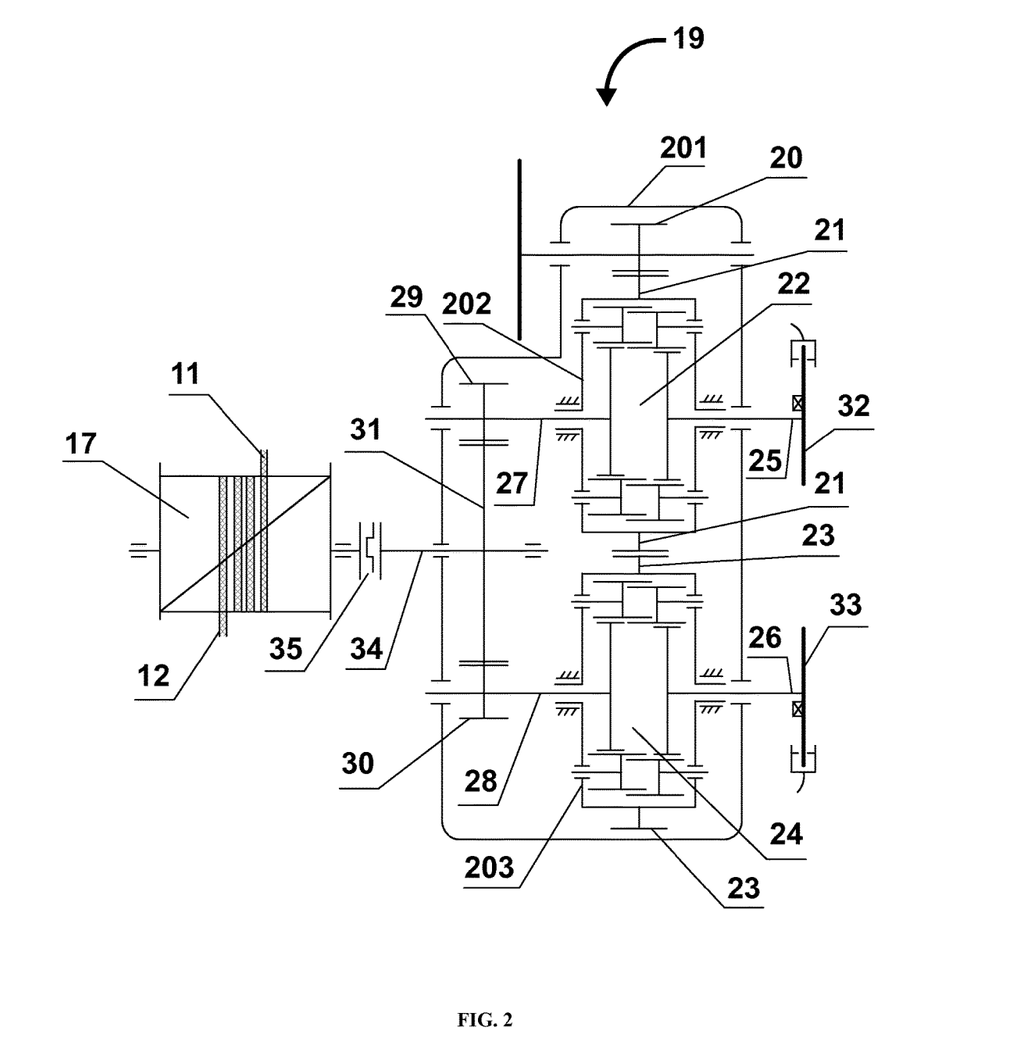
FIG. 2 illustrates a reversing reducer.

As illustrated by FIG. 1, the dual horsehead block and tackle beam pumping unit 100 comprises a steel frame 1, a walking beam 2, horseheads 3 and 4, movable pulleys 5 and 6, pulling wire ropes 11 and 12, load wire ropes 13 and 14, damping extension springs 15 and 16, an output drum 17, a counterweight box 18, a reversing reducer 19 illustrated in FIG. 2, reversing brake mechanisms 32 and 33 illustrated in FIG. 2, and an electric motor. The reversing reducer 19 and the electric motor are not shown in FIG. 1. The structure of the dual horsehead block and tackle beam pumping unit 100 is as aforementioned and is a balanced structure in general. The walking beam 2 is installed on top of the steel frame 1 with a hinged connection 102. The horseheads 3 and 4 are installed on opposing ends 2a and 2b of the walking beam 2 respectively, and are balanced around the center of the steel frame 1. Each horsehead 3 or 4 has a movable pulley 5 or 6 installed respectively. The movable pulleys 5 and 6 can be installed on the top, middle or bottom of the horseheads 3 and 4. The movable pulleys 5 and 6 can also be installed on a hinged linkage 36 illustrated in FIG. 7. The optimal install position for the movable pulley 5 or 6 is a position that gives the horsehead 3 or 4 a large swing range, increases stroke length, and reduces a driving force for the horsehead 3 or 4. A sucker rod 101 is connected to the horsehead 3 on the left side by a load wire rope 13 through a rope hanger.

Figure 7:
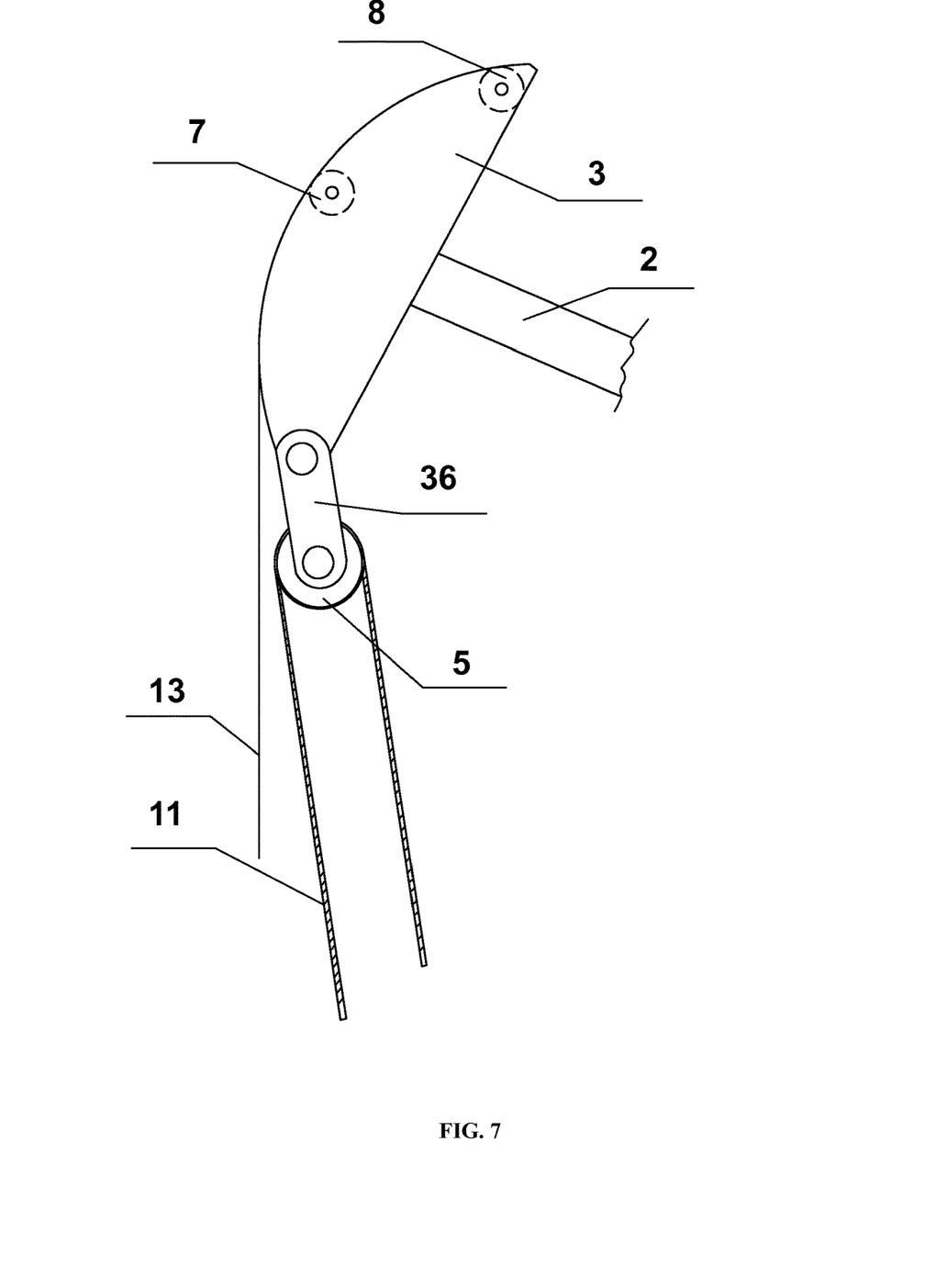
FIG. 7 illustrates a movable pulley mounted on the bottom of a horsehead with a hinged connection.

There are two methods to install the movable pulleys 5 and 6:

Method 1: Single movable pulley mechanism. As illustrated by FIG. 1, first ends 11a and 12a of the pulling wire ropes 11 and 12 are connected to the damping extension springs 15 and 16 respectively, and second ends 11b and 12b of the pulling wire ropes 11 and 12 pass through the movable pulleys 5 and 6 on the horseheads 3 and 4 respectively and are connected to the output drum 17. The movable pulleys 5 and 6 can be installed on the bottom positions of the horseheads 3 and 4 respectively, as well as on the top positions 8 and 10, or on the middle positions 7 and 9 of the horseheads 3 and 4 respectively. As illustrated by FIG. 7, the movable pulley 5 on the left horsehead 3 can also be installed on the hinged linkage 36. The horsehead 4 and the movable pulley 6 on the right hand side should be installed in the same way. The pulling force can be reduced by ½ when using the single movable pulley mechanism.

Figure 8:
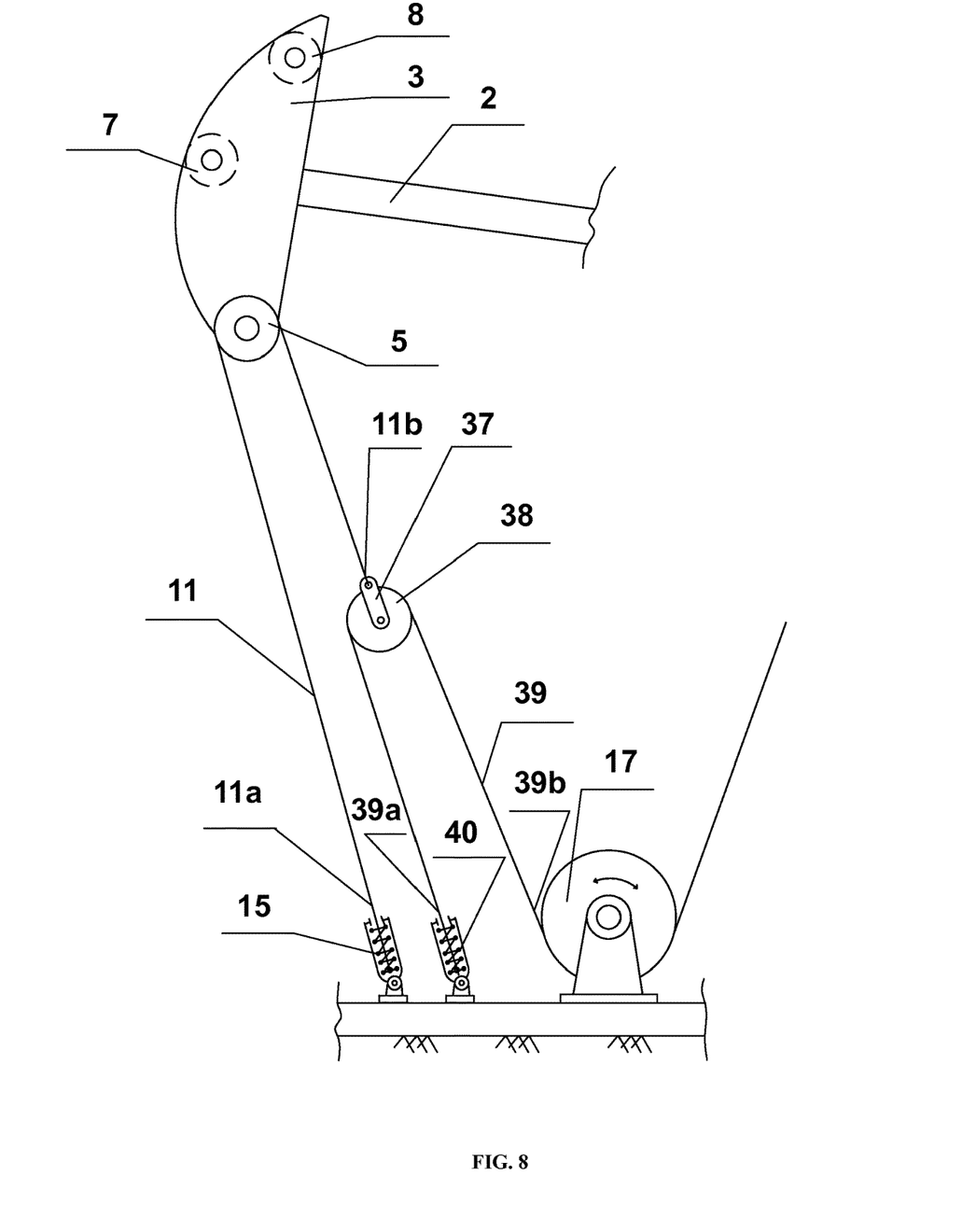
FIG. 8 illustrates an embodiment of the dual horsehead block and tackle beam pumping unit with two movable pulleys.

Method 2: Dual movable pulley mechanism. As illustrated by FIG. 8, the dual movable pulley mechanism adds one movable pulley 38, one piece of a wire rope 39, and one damping extension spring 40. The first end 11a of the first pulling wire rope 11 is connected to the first damping extension spring 15, and the second end 11b of the first pulling wire rope 11 passes through the movable pulley 5 on the horsehead 3 and is connected to an axle connecting plate 37 of the second movable pulley 38. The first end 39a of the second wire rope 39 is connected to the second damping extension spring 40, and the second end 39b of the second wire rope 39 passes through the second movable pulley 38 and is connected to the output drum 17. The second pulling wire rope 12 on the right hand side illustrated in FIG. 1, should be installed in the same way. The pulling force can be reduced by ¼ when using the dual movable pulley mechanism.

Figure 3:
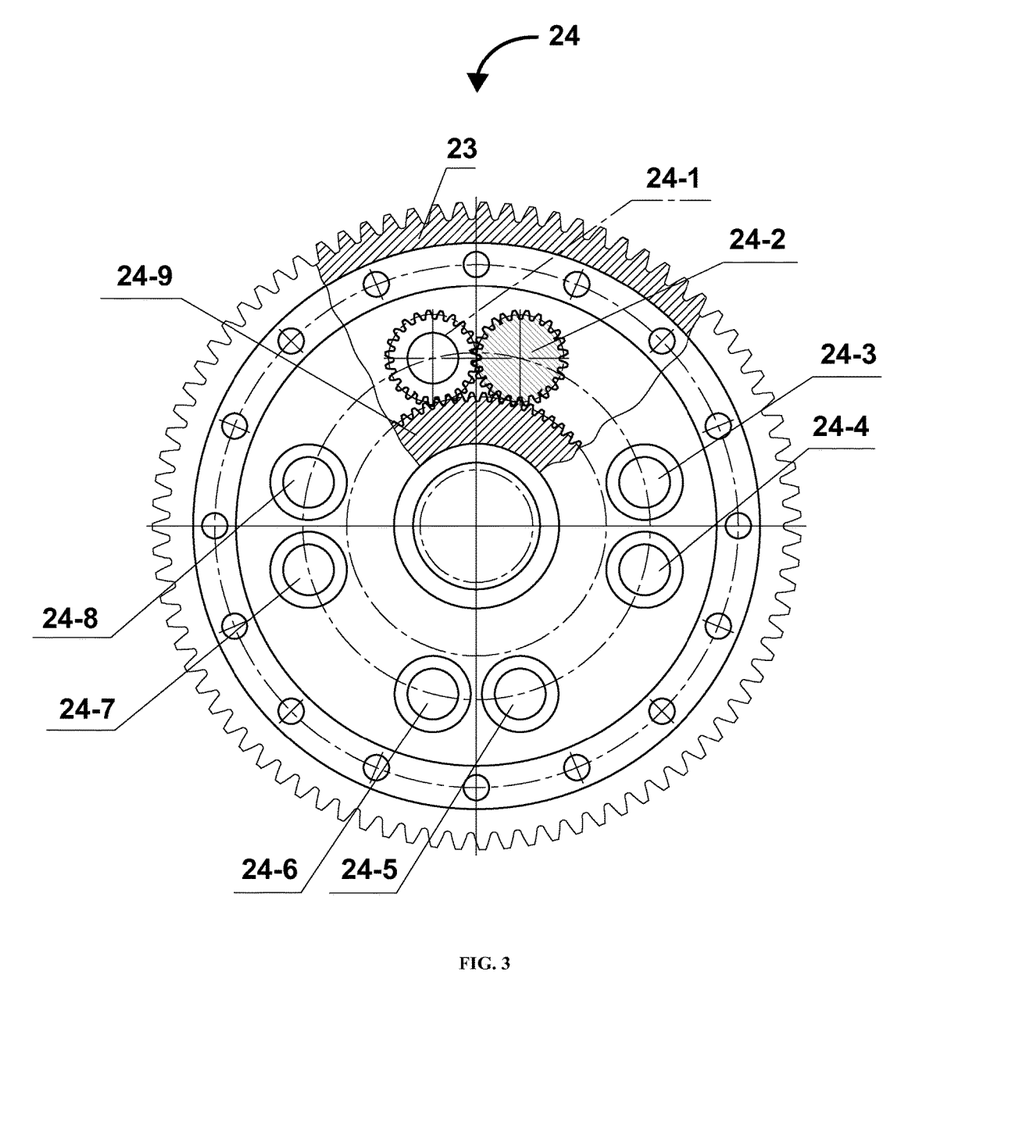
FIG. 3 illustrates the positions of planetary gears in a spur-gear differential.
Figure 4:
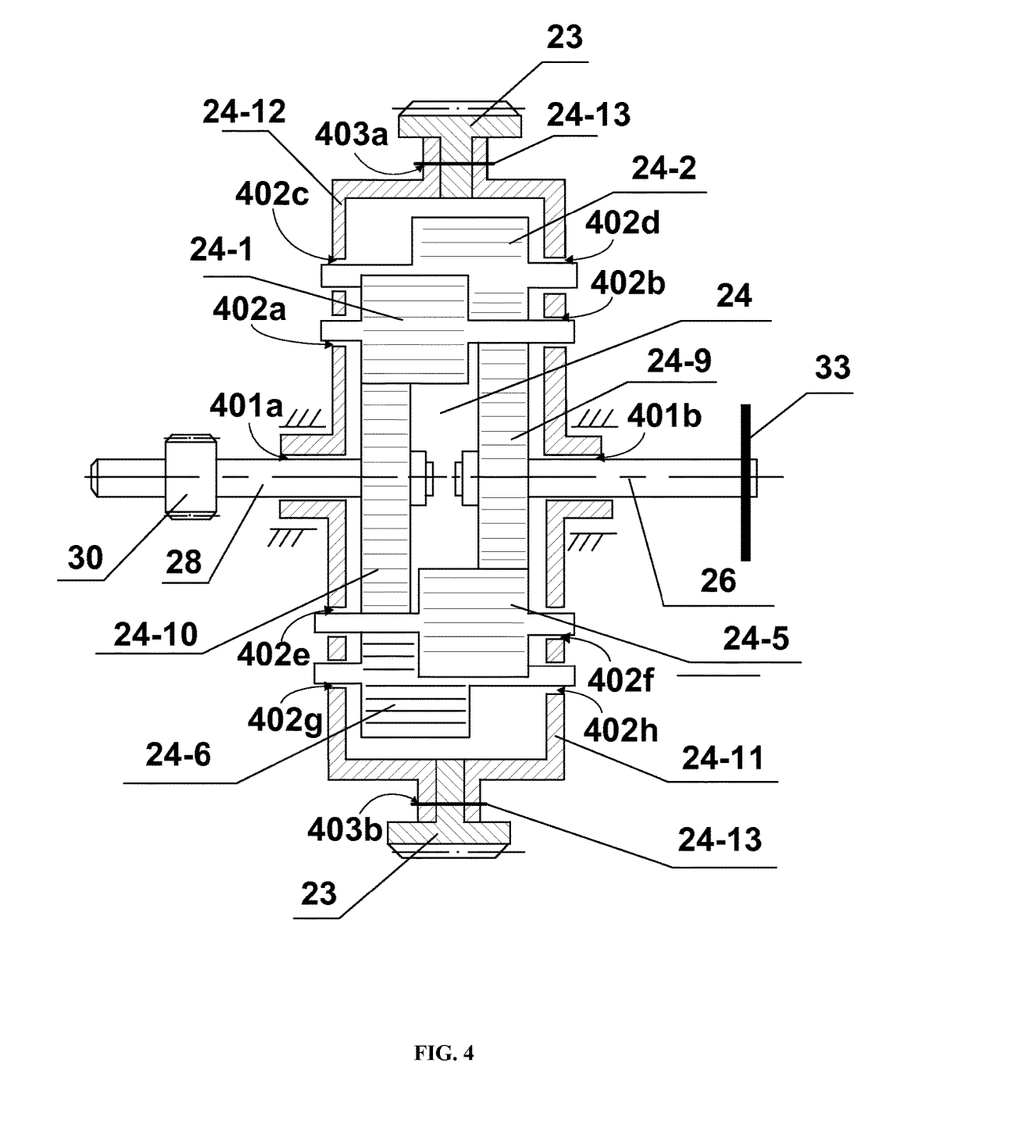
FIG. 4 illustrates a sectional view of the spur-gear differential.

As illustrated by FIG. 2, the reversing reducer 19 comprises an input gear 20, two differentials 22 and 24, outer gears 21 and 23, four semi-axles 25, 26, 27 and 28, gears 29 and 30, an output gear 31, and a coupler 35. The outer gears 21 and 23 are installed on casings 202 and 203 of the differentials 22 and 24 respectively. The outer gears 21 and 23 are intermeshing or intermeshing through one to three idle gears (not shown). Each of the differentials 22 and 24 has a setup of four pairs of planetary gears and two sun gears as illustrated by FIG. 3 and FIG. 4. The four semi-axles 25, 26, 27 and 28 are inserted into the four sun gears of the two differentials 22 and 24 with splined connections. The gears 29 and 30 are installed on the output side of the semi-axles 27 and 28 respectively. In an embodiment, the semi-axles 27 and 28 are configured as spline shafts directly. The output gear 31 sits in between and intermeshes with the two gears 29 and 30. An output shaft 34 extends out of the reversing reducer casing 201 and is connected to the output drum 17 through the coupler 35. The two semi-axles 25 and 26 on the other side extend out of the reversing reducer casing 201, on which the reversing brake mechanisms 32 and 33 are installed. The reversing brake mechanisms 32 and 33 lock the two semi-axles 25 and 26 alternatively, which causes the sun gears and the planetary gears in the differentials 22 and 24 to complete the reversing process through rotation, spin, change of speed, and change of direction. Thus, the reversing reducer 19 can generate an output torque in either direction and drive the output drum 17 in either direction. When the output drum 17 turns in a clockwise direction, the output drum 17 pulls the second pulling wire rope 12 on the right hand side and releases the first pulling wire rope 11 on the left hand side. The horsehead 3 on the left hand side will move upward and bring the sucker rod 101 upward together. The horsehead 4 on the right hand side will move downward together with the counterweight box 18. When the output drum 17 turns in a counterclockwise direction, the movements of all parts are in the opposite directions.

Figure 5:
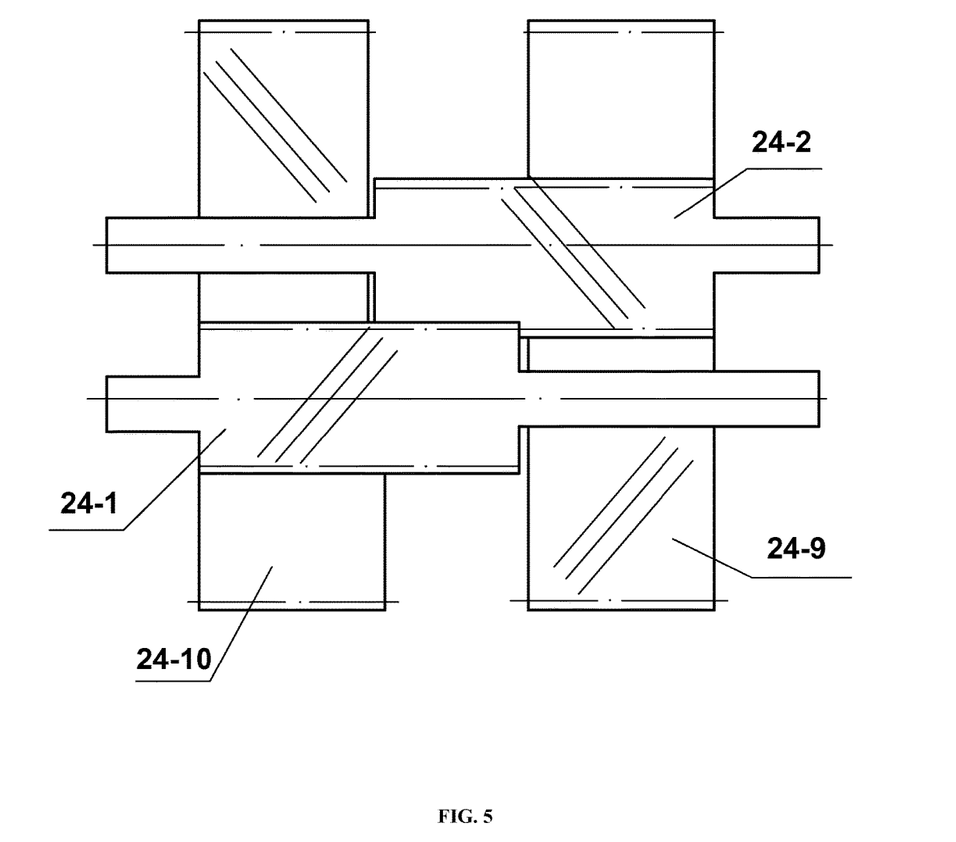
FIG. 5 illustrates sun gears engaged with planetary gears.

As illustrated by FIG. 3 and FIG. 4, the differentials 22 and 24 are spur-gear differentials and are identical in structure. The differential 24 comprises planetary gears 24-1, 24-2, 24-3, 24-4, 24-5, 24-6, 24-7 and 24-8, sun gears 24-9 and 24-10, casings 24-11 and 24-12, outer gears 23 on the casing circumference, and connection bolts 24-13. The sun gears 24-9 and 24-10 and the planetary gears 24-1, 24-2, 24-3, 24-4, 24-5, 24-6, 24-7 and 24-8 are all spur gears. The two sun gears 24-9 and 24-10 are set up on the right side and the left side respectively. Four pairs of the planetary gears 24-1, 24-2, 24-3, 24-4, 24-5, 24-6, 24-7 and 24-8 are distributed evenly along a circle where each pair is spaced by 90°. Each pair of the planetary gears, for example, 24-1 and 24-2 is intermeshed with each other by ½ tooth width while the other ½ of the tooth is intermeshed with its own sun gear 24-9 or 24-10 as illustrated by FIG. 5. The sun gears 24-9 and 24-10 and the planetary gears 24-1, 24-2, 24-3, 24-4, 24-5, 24-6, 24-7 and 24-8 are installed inside the casings 24-11 and 24-12, which also serve as a carrier for the planetary gear train. The casings 24-11 and 24-12 comprise two identical circular plates which have center holes 401a and 401b, planetary gear holes, for example, 402a, 402b, 402c, 402d, 402e, 402f, 402g, and 402h, and connection bolt holes 403a and 403b. The center holes 401a and 401b are spline holes matching the sun gears 24-9 and 24-10 and are used to insert the semi-axles 25, 26, 27 and 28. The planetary gear holes are used to install the planetary gears 24-1, 24-2, 24-3, 24-4, 24-5, 24-6, 24-7 and 24-8. For example, the planetary gear holes 402a, 402b, 402c, 402d, 402e, 402f, 402g, and 402h illustrated in FIG. 4, are used to install the planetary gears 24-1, 24-2 and 24-5, 24-6 of the differential 24. The connection bolts 24-13 bolt the two casings 24-11 and 24-12 of the differential 24 and the outer gears 23 together through the connection bolt holes 403a and 403b. The other differential 22 illustrated in FIG. 2, has the same structure.

Figure 6:
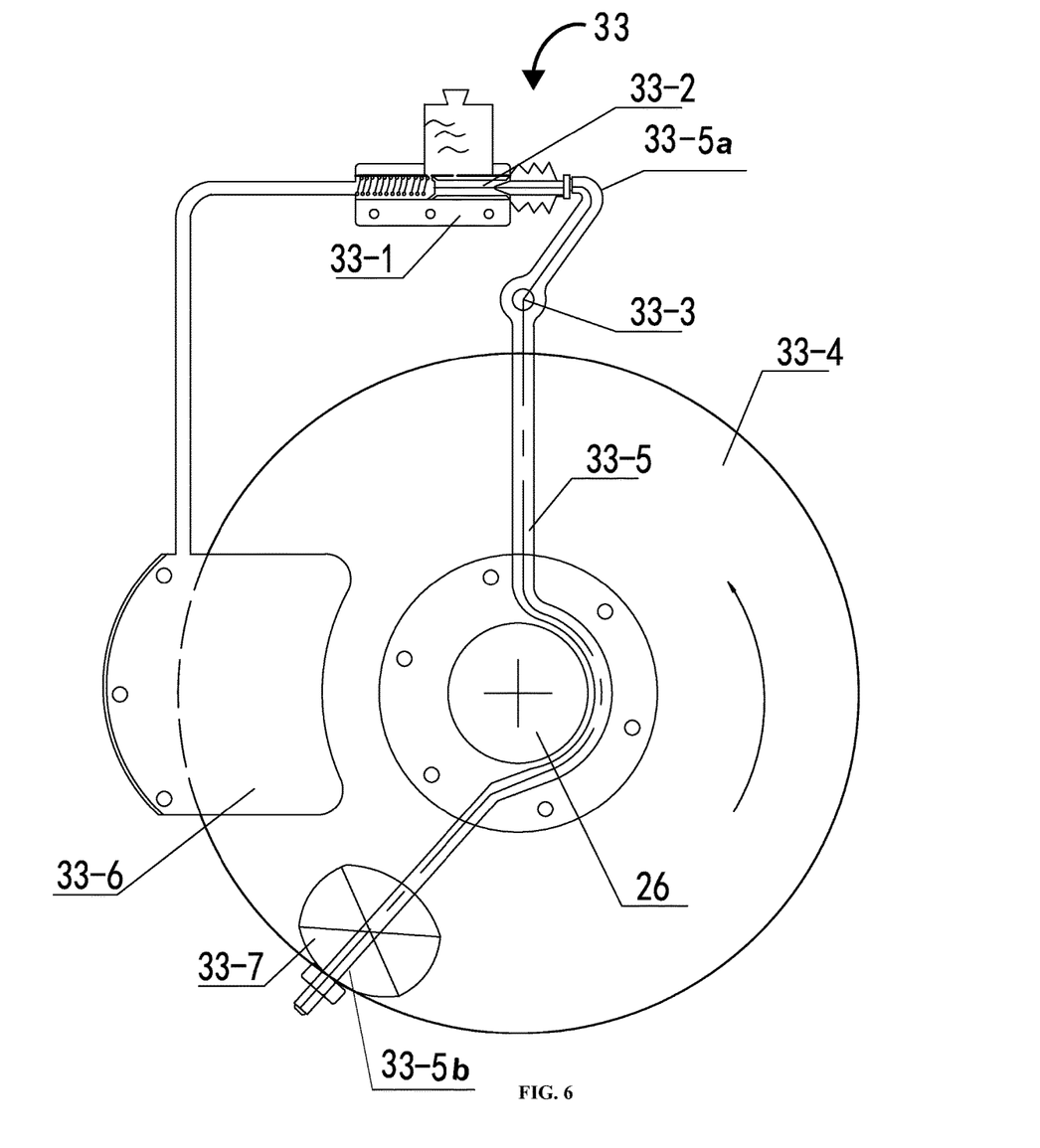
FIG. 6 illustrates a reversing brake mechanism.

As illustrated by FIG. 6, the reversing brake mechanism 33 comprises a plunger hydraulic pump 33-1, a brake disc 33-4, a lever 33-5, a brake caliper 33-6, an electromagnet 33-7, and a reversing control system. The plunger hydraulic pump 33-1 is installed on top of the casing 201 of the reversing reducer 19 illustrated in FIG. 2. The brake caliper 33-6 is installed in the middle of the casing 201 of the reversing reducer 19 and embraces the brake disc 33-4. The fulcrum of the lever 33-5 is hinged, that is, flexibly connected to a pivot pin 33-3 on the casing 201 of the reversing reducer 19. The upper end 33-5a of the lever 33-5 pushes against a plunger 33-2 of the plunger hydraulic pump 33-1 as the load side. The lower end 33-5b of the lever 33-5 is connected to the electromagnet 33-7 as the effort side. When the electromagnet 33-7 is activated, the electromagnet 33-7 attracts the brake disc 33-4 and attaches itself to the rotating brake disc 33-4. The rotating brake disc 33-4 then drives the lever 33-5 to rotate together to a certain angle where the upper end 33-5a or load side of the lever 33-5 pushes in the plunger 33-2 of the plunger hydraulic pump 33-1. The positive pressure amplified by the lever 33-5 and the plunger hydraulic pump 33-1 is applied to the brake caliper 33-6 to stop the corresponding brake disc 33-4 and semi-axle 26. The reversing brake mechanism 32 illustrated in FIG. 2, has the same structure.

This braking process does not require external forces. This braking process relies on the rotation of the brake disc 33-4 which has the electromagnet 33-7 attached on and thus drives the lever 33-5 to rotate together to a certain angle. The upper end 33-5a of the lever 33-5 then pushes in the plunger 33-2 and the plunger hydraulic pump 33-1 applies the brake as a self-contained system. The reversing brake mechanism 33 does not require a motor-driven master cylinder and a cooling system, and therefore eliminates maintenance of the master cylinder and periodic change of a brake fluid. The reversing brake mechanism 33 has a high reliability and a long service life. If both the reversing brake mechanisms 32 and 33 illustrated in FIG. 2, fail, the two differentials 22 and 24 would work in an idle mode, and the semi-axles 27 and 28 on the output side, the output shaft 34, and the output drum 17 illustrated in FIG. 2, would all stay stationary. The reversing reducer 19 has no output torque under this circumstance and will not cause any accidents.

The reversing control system comprises control circuits (not shown), proximity switches (not shown), and electromagnets, for example, 33-7 exemplarily illustrated in FIG. 6. The control circuits are arranged in a switchboard cabinet at the well site, and use a 12V to 36V DC power supply to control two electromagnets to work alternately. The power requirement for the electromagnets is 30 W to 100 W. The two proximity switches are installed at an upper endpoint and a lower endpoint of a counterweight box track (not shown) that houses the counterweight box 18, respectively. The two proximity switches can also be installed at a beginning point and an endpoint of a swing range of the walking beam 2 illustrated in FIG. 1.

The dual horsehead block and tackle beam pumping unit 100 can be used for a single well operation and a dual well operation. The dual horsehead block and tackle beam pumping unit 100 has more advantages when used for dense and viscous, heavy oil wells where the loads are large. The dual horsehead block and tackle beam pumping unit 100 disclosed herein is not limited to specific embodiments as disclosed above. As long as the movable pulleys 5 and 6 are installed on the horseheads 3 and 4 respectively, or the reversing reducer technique is used in any application, such embodiments all fall within the scope of the dual horsehead block and tackle beam pumping unit 100 disclosed herein.

We claim:

1. A dual horsehead block and tackle beam pumping unit comprising:
   a steel frame;
   a walking beam connected to a top end of the steel frame via a hinged connection, the walking beam configured to oscillate about the hinged connection;
   horseheads attached to opposing ends of the walking beam;
   load wire ropes suspended from the horseheads, the load wire ropes moving in one of an upward direction and a downward direction with the horseheads, wherein a lower end of one of the load wire ropes suspended from one of the horseheads is connected to a sucker rod configured to perform a pumping action, and wherein a lower end of another one of the load wire ropes suspended from an opposing one of the horseheads is connected to a counterweight box for countering motion of the walking beam;
   movable pulleys operably connected to the horseheads;
   pulling wire ropes threaded through the movable pulleys, wherein a first end of each of the pulling wire ropes is operably connected to a damping extension spring, and wherein a second end of the each of the pulling wire ropes is operably connected to an output drum positioned on a base of the steel frame;
   a reversing reducer mounted on the base of the steel frame, the reversing reducer comprising semi-axles, an input shaft operably connected to an electric motor to receive a torque from the electric motor and facilitate rotation of a first set of the semi-axles, and an output shaft operably connected to the output drum, wherein a second set of the semi-axles are operably connected to the output shaft and are configured to facilitate rotation of the output shaft and, in turn, the output drum in one of a clockwise direction and a counterclockwise direction; and
   reversing brake mechanisms operably connected to the reversing reducer via the first set of the semi-axles, each of the reversing brake mechanisms configured to brake the rotation of one of the first set of the semi-axles for reversing the rotation of the output shaft of the reversing reducer and, in turn, the output drum to an opposing one of the clockwise direction and the counterclockwise direction, wherein the rotation of the output drum in the one of the clockwise direction and the counterclockwise direction alternately exerts a tension on the pulling wire ropes, the pulling wire ropes configured to move the horseheads in one of an upward direction and a downward direction, causing movement of one of the load wire ropes in the one of the upward direction and the downward direction, thereby driving the sucker rod in one of the upward direction and the downward direction for producing the pumping action.

2. The dual horsehead block and tackle beam pumping unit of claim 1, wherein each of the movable pulleys is positioned on one of a top position, a middle position, and a bottom position of each of the horseheads.

3. The dual horsehead block and tackle beam pumping unit of claim 1, wherein each of the movable pulleys is connected to a corresponding one of the horseheads via a hinged linkage.

4. The dual horsehead block and tackle beam pumping unit of claim 1, wherein each of the movable pulleys is configured as a single movable pulley mechanism, wherein the single movable pulley mechanism comprises a single movable pulley operably connected to a corresponding one of the horseheads.

5. The dual horsehead block and tackle beam pumping unit of claim 1, wherein each of the movable pulleys is configured as a dual movable pulley mechanism operably connected to a corresponding one of the horseheads, wherein the dual pulley mechanism comprises:
   a first movable pulley; and
   a second movable pulley operably connected to the first movable pulley via an axle connecting plate attached to the second movable pulley, wherein a first end of one of the pulling wire ropes is operably connected to a first damping extension spring, and a second end of the one of the pulling wire ropes passes through the first movable pulley and operably connects to the axle connecting plate, and wherein a first end of a supplementary wire rope is operably connected to a second damping extension spring, and a second end of the supplementary wire rope passes through the second movable pulley and operably connects to the output drum.

6. The dual horsehead block and tackle beam pumping unit of claim 1, further comprising a coupler configured to operably connect the output shaft to the output drum.

7. The dual horsehead block and tackle beam pumping unit of claim 1, wherein the reversing reducer further comprises:
   an input gear mounted on the input shaft and operably connected to the electric motor;
   a set of differentials comprising outer gears, the outer gears mounted on casings of the differentials, the outer gears configured to intermesh with one or more idle gears positioned between the outer gears, wherein one of the differentials is operably connected to the input gear, and wherein each of the differentials comprises sun gears and planetary gears configured to transmit the torque supplied by the input shaft to the first set of the semi-axles and to the second set of the semi-axles;
   the first set of the semi-axles and the second set of the semi axles inserted into the sun gears of the differentials, wherein the first set of the semi-axles extends out of a casing of the reversing reducer and is mounted by the reverse braking mechanisms, the reverse braking mechanisms configured to lock the first set of the semi-axles alternately for the reversal of the rotation of the output shaft in the opposing one of the clockwise direction and the counterclockwise direction; and
   an output gear mounted on the output shaft and positioned between a set of semi-axle gears mounted on the second set of the semi-axles and intermeshing with the set of semi-axle gears for transmitting the torque from the second set of the semi-axles to the output shaft and, in turn, to the output drum.

8. The dual horsehead block and tackle beam pumping unit of claim 7, wherein the each of the differentials is a spur-gear differential comprising:
   the sun gears, wherein one of the sun gears is coaxially connected to one of the first set of the semi-axles and is configured to transmit the torque to the one of the first set of the semi-axles, and wherein an opposing one of the sun gears is coaxially connected to one of the second set of the semi-axles and is configured to brake a rotation of a corresponding one of the differentials via one of the reversing brake mechanisms; and
   the planetary gears in engageable communication with the sun gears, wherein the planetary gears of the each of the differentials are arranged in pairs, and wherein each of the pairs of the planetary gears is set apart from each other by a uniform angular distance and is in engageable communication with each other to rotate and revolve between the sun gears and to transmit the torque to another one of the differentials via an idle gear on the braking of the rotation of the corresponding one of the differentials.

9. The dual horsehead block and tackle beam pumping unit of claim 8, wherein the each of the pairs of the planetary gears is set apart from each other by an angle of 90°.

10. The dual horsehead block and tackle beam pumping unit of claim 7, wherein said casings are configured to house the sun gears and the planetary gears of the differentials, and wherein the casings comprise center holes, planetary gear holes, and connection bolt holes, wherein the center holes are positioned proximal to the sun gears and are configured to receive and accommodate the first set of the semi-axles and the second set of the semi-axles, and wherein the planetary gear holes are configured to receive and install axles of the planetary gears, and wherein the connection bolt holes are configured to receive connection bolts for securing the casings of the differentials to each other and for securing the outer gears to the casings.

11. The dual horsehead block and tackle beam pumping unit of claim 1, wherein each of the reversing brake mechanisms comprises:
a brake disc mounted on one of the first set of the semi-axles of the reversing reducer;
an electromagnet magnetically attached to the brake disc and rotating with the brake disc, when activated by an electric current;
a lever comprising an upper end and a lower end, wherein the lower end of the lever is operably connected to the electromagnet and is driven by the brake disc magnetically attached to the electromagnet, and wherein the lever is hingedly connected to a pivot pin mounted on a casing of the reversing reducer at a fulcrum of the lever;
a plunger hydraulic pump comprising a plunger operably connected to the upper end of the lever and mounted on the casing of the reversing reducer, wherein the upper end of the lever pushes the plunger to actuate the plunger hydraulic pump, when driven by the brake disc; and
a brake caliper extending from the plunger hydraulic pump and mounted at a predetermined location on the casing of the reversing reducer for engaging and braking the brake disc and the one of the first set of the semi-axles of the reversing reducer, wherein the actuated plunger hydraulic pump actuates the brake caliper to contact the brake disc and terminate the rotation of the brake disc and the one of the first set of the semi-axles of the reversing reducer.

12. The dual horsehead block and tackle beam pumping unit of claim 1, further comprising one or more control circuits configured to control an alternate operation of electromagnets of the reversing brake mechanisms.

13. The dual horsehead block and tackle beam pumping unit of claim 1, further comprising proximity switches positioned on an upper end and a lower end of a track containing the counterweight box, wherein the proximity switches are configured to detect a presence of the counterweight box and trigger one or more control circuits to control an alternate operation of electromagnets of the reversing brake mechanisms.

14. The dual horsehead block and tackle beam pumping unit of claim 1, further comprising proximity switches positioned on the opposing ends of the walking beam, wherein the proximity switches are configured to detect a presence of the counterweight box and trigger one or more control circuits to control an alternate operation of electromagnets of the reversing brake mechanisms.

* * * * *